(12) United States Patent
Dufner

(10) Patent No.: US 11,260,568 B2
(45) Date of Patent: Mar. 1, 2022

(54) COLD RUNNER BLOCK

(71) Applicant: Kloeckner Desma Elastomertechnik GmbH, Fridingen (DE)

(72) Inventor: Manfred Dufner, Krauchenwies (DE)

(73) Assignee: Kloeckner Desma Elastomertechnik GmbH, Fridingen (DE)

( * ) Notice: Subject to any disclaimer, the term of this patent is extended or adjusted under 35 U.S.C. 154(b) by 0 days.

(21) Appl. No.: 17/051,211

(22) PCT Filed: Apr. 26, 2019

(86) PCT No.: PCT/EP2019/060753
§ 371 (c)(1),
(2) Date: Oct. 28, 2020

(87) PCT Pub. No.: WO2019/211191
PCT Pub. Date: Nov. 7, 2019

(65) Prior Publication Data
US 2021/0053263 A1 Feb. 25, 2021

(30) Foreign Application Priority Data

May 1, 2018 (DE) ..................... 10 2018 110 427.8

(51) Int. Cl.
*B29C 45/27* (2006.01)
*B29C 45/17* (2006.01)
(Continued)

(52) U.S. Cl.
CPC ...... *B29C 45/2756* (2013.01); *B29C 45/1753* (2013.01); *B29C 45/2606* (2013.01); *B29C 45/332* (2013.01); *B29K 2021/006* (2013.01)

(58) Field of Classification Search
CPC .............. B29C 45/2756; B29C 45/332; B29C 45/2606; B29K 2021/006
(Continued)

(56) References Cited

U.S. PATENT DOCUMENTS

| 5,427,519 A | 6/1995 | Gellert |
| 5,798,127 A | 8/1998 | Thayer et al. |
| 6,851,946 B1 * | 2/2005 | Plass .................. B29C 45/2727 425/572 |

FOREIGN PATENT DOCUMENTS

| CN | 205380845 U | * | 7/2016 |
| CN | 207256755 U | * | 4/2018 |

(Continued)

OTHER PUBLICATIONS

Machine translation JPH01275115 (Year: 1989).*
(Continued)

*Primary Examiner* — Matthew J Daniels
*Assistant Examiner* — Wayne K. Swier
(74) *Attorney, Agent, or Firm* — Collard & Roe, P.C.

(57) ABSTRACT

The invention relates to a cold runner block in a vertically operating injection molding machine for processing elastomer materials with an upper fixed molding platen and a molding platen arranged thereunder which is movable relative to the fixed molding platen, between which a molding tool having a plurality of mold cavities is arranged and wherein the cold runner block is arranged between the fixed molding platen and the molding tool, the cold runner block containing a distribution plate having the cold runners and containing a nozzle plate with nozzles each assigned to one of the plurality of mold cavities, which is characterized in that the distribution plate formed from a plurality of distribution strips (10-40) is arranged on a retaining plate (2), which can be fastened to the fixed, feed-side molding platen in such a way that each distribution strip (10-40) is connected by means of two bolts (3) to the retaining plate (2) in that the head (5) of each bolt (3) facing away from the distribution strip (10-40) forms a retaining element which is T-shaped in section, the retaining element being displaceably guided in the direction transverse to the distribution
(Continued)

Figure 1:
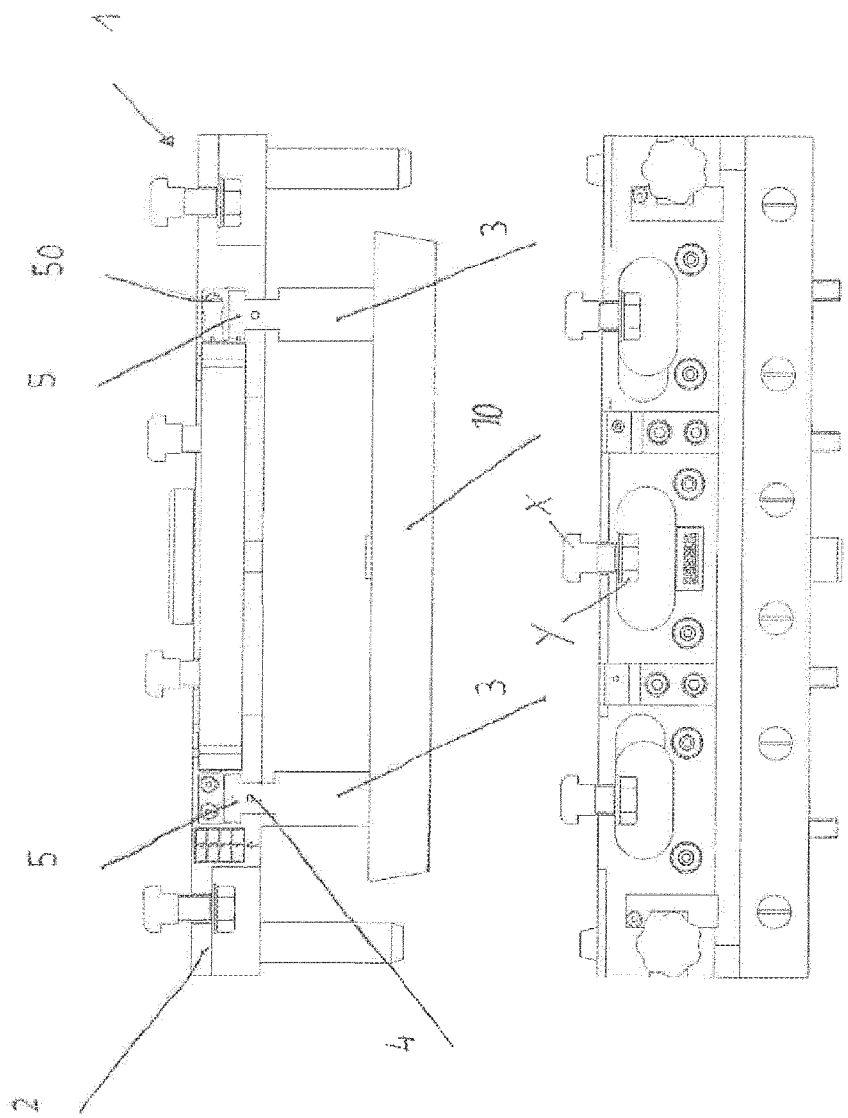

strip's longitudinal axis in guide rails (50) which are formed in the retaining plate (2) and are designed in section to complement the bolt head (5).

4 Claims, 3 Drawing Sheets

(51) Int. Cl.
    *B29C 45/26*     (2006.01)
    *B29C 45/33*     (2006.01)
    *B29K 21/00*     (2006.01)

(58) Field of Classification Search
    USPC .......................................................... 425/542
    See application file for complete search history.

(56) References Cited

FOREIGN PATENT DOCUMENTS

| | | |
|---|---|---|
| DE | 195 22 328 A1 | 1/1996 |
| DE | 103 06 876 A1 | 9/2004 |
| DE | 10306876 A1 * | 9/2004 ......... B29C 45/2756 |
| DE | 10 2015 013 130 A1 | 4/2017 |
| DE | 102015013130 A1 * | 4/2017 ......... B29C 45/2602 |
| JP | 01275115 A * | 11/1989 ......... B29C 45/2725 |
| JP | H01275115 A | 11/1989 |
| JP | 10113950 A * | 5/1998 ......... B29C 45/2756 |

OTHER PUBLICATIONS

Machine translation JP10113950 (Year: 1998).*
Machine translation DE10306876 (Year: 2004).*
Machine translation CN20530845 (Year: 2016).*
Machine translation DE102015013130 (Year: 2017).*
Machine translation CN207256755 (Year: 2018).*
International Search Report in PCT/EP2019/060753, dated Sep. 6, 2019.

* cited by examiner

COLD RUNNER BLOCK

CROSS REFERENCE TO RELATED APPLICATIONS

This application is the National Stage of PCT/EP2019/060753 filed on Apr. 26, 2019, which claims priority under 35 U.S.C. §119 of German Application No. 10 2018 110 427.8 filed on May 1, 2018, the disclosure of which is incorporated by reference. The international application under PCT article 21(2) was not published in English.

The invention relates to a cold runner block in a vertically operating injection molding machine for processing elastomer materials, with an upper fixed molding platen and a molding platen arranged thereunder which is movable relative to the fixed molding platen, between which a molding tool having a plurality of mold cavities is arranged and wherein the cold runner block is arranged between the fixed molding platen and the molding tool, the cold runner block containing a distribution plate having the cold runners and containing a nozzle plate with nozzles each assigned to one of the plurality of mold cavities.

In these previously known cold runner systems (e.g. from DE 195 22 328 A1 or U.S. Pat. No. 5,798,127), in which elastomers are distributed to various nozzle positions at a controlled temperature, the distribution channels have to be thoroughly cleaned when changing over to a different elastomer. This generally takes place outside the machine, which is quite time-consuming since the generally heavy cold runner block can only be dismantled using a crane.

The invention is therefore based on the object of configuring a cold runner block of the type mentioned above such that the distribution plate or the distribution channels that are arranged in this distribution plate can also be cleaned in the machine.

To achieve this object, the present invention proposes that the distribution plate formed from a plurality of distribution strips is arranged on a retaining plate, which can be fastened to the fixed, feed-side molding platen, in such a way that each distribution strip is connected to the retaining plate by means of two bolts in that the head of each bolt facing away from the distribution strip forms a retaining element which is T-shaped in section, the retaining element being displaceably guided in the direction transverse to the distribution strip's longitudinal axis in guide rails which are formed in the retaining plate and are designed in section to complement the bolt head.

In this way it is possible, after releasing the connection between nozzle plate and distribution plate or the retaining plate, to displace the individual distribution strips, which at this stage hang down from the retaining plate, such that a sufficiently large space is produced between the individual strips for the channel portions that are present in the individual strips to be accessible for cleaning.

After cleaning, the individual distribution strips are reassembled to form the distribution plate, and the nozzle plate is moved upwards and connected to the retaining plate such that the distribution plate formed from the individual distribution strips is locked between the retaining plate and the nozzle plate in the manner of a sandwich.

Because the distribution strips hang down from the retaining plate after the injection molding machine has been opened and are freely accessible, so that they can be slid towards each other or away from each other in the guide rails, it becomes possible to clean the channels in the individual strips inside the machine.

This gives rise to the advantage that, without manipulations using a crane, the time needed to clean these channels is reduced significantly.

It is also possible that the individual distribution strips are held and guided directly in corresponding guide grooves in the upper molding platen.

In order to ensure that the individual distribution strips can also be removed from the machine, the guide grooves or guide rails are configured such that they are open at the ends.

A central runner passing through the retaining plate and leading to the distribution plate is used for feeding the plasticated material.

Figure 2:
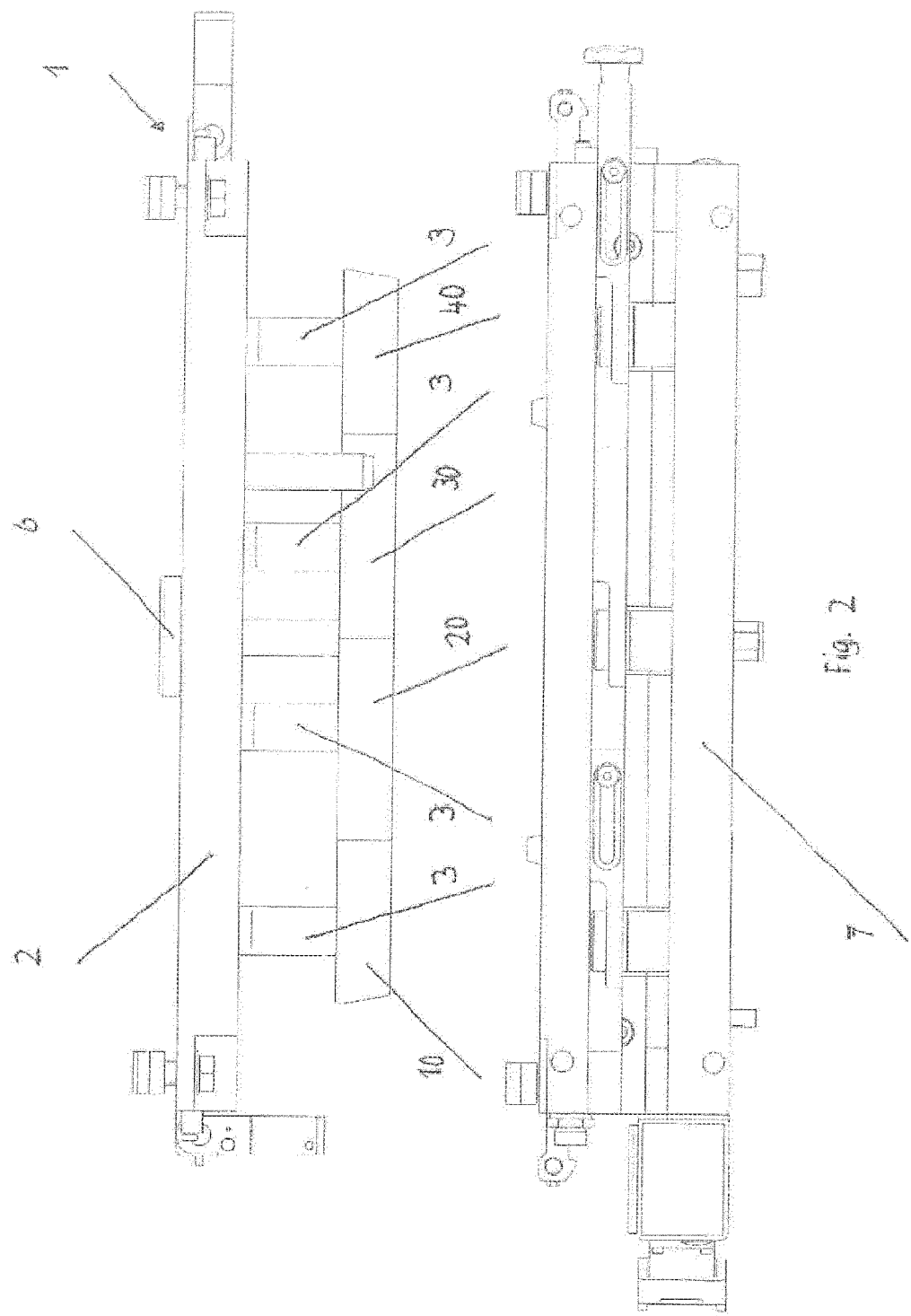
Figure 3:
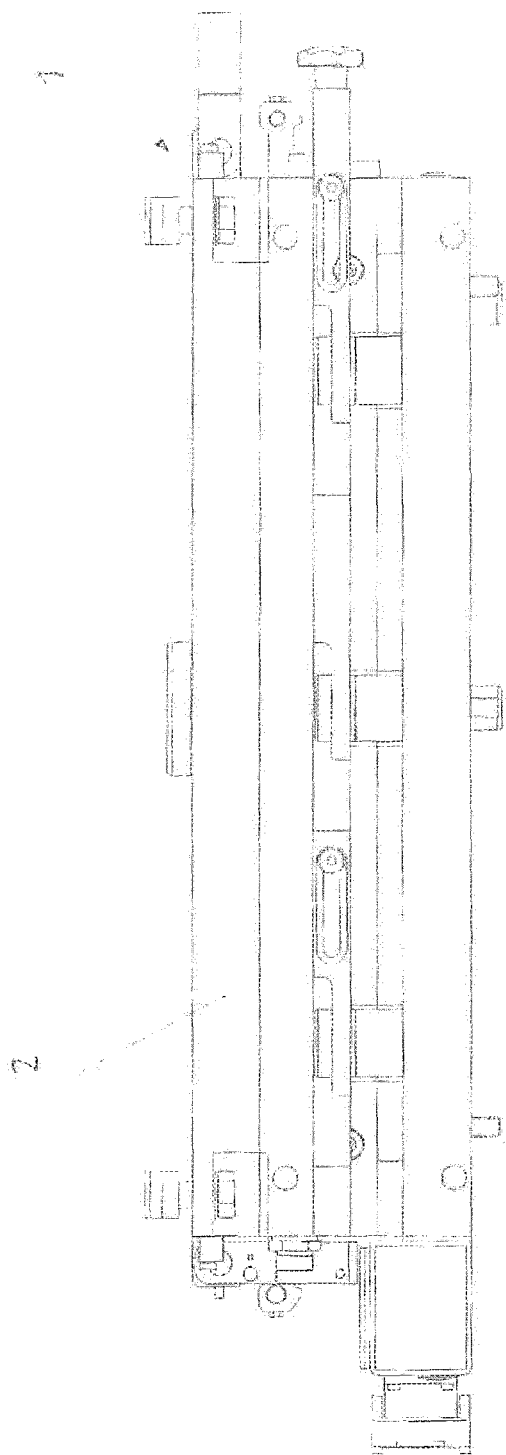

The invention is illustrated and explained below with reference to drawings, which show the following:

FIG. 1: cold runner block in a front view and in an open state,

FIG. 2: cold runner block according to FIG. 1 in a side view,

FIG. 3: cold runner block in a closed state.

FIGS. 1-3 show a cold runner block, which is provided with the general reference number 1. This cold runner block is arranged in an injection molding machine (not illustrated) between an upper fixed molding platen and a movable molding platen which is arranged thereunder and which supports a molding tool, which are likewise not illustrated.

The cold runner block 1 according to the invention is constructed from a retaining plate 2, in the bottom of which groove-shaped guide rails 50 are formed. In these guide rails 50, distribution strips 10-40 are displaceably guided by way of the distribution strips 10-40 being provided with bolts 3, at the free ends 4 of which bolt heads 5 having a T-shaped cross-section are provided, which are held in the profiles of the guide rails 50 which have a complementary cross-section.

The distribution strips 10-40, in their pushed-together state, form a distribution plate in which the distribution channels (not illustrated) are provided, which are supplied via a runner 6 from a (likewise not illustrated) plasticating and injection unit. The distribution channels lead into nozzles, which fill the mold cavities provided in the molding tool with the plasticated material.

The nozzles are located in a nozzle plate 7, which is arranged under the distribution plate. The nozzle plate 7 is connected to the retaining plate 2 via a locking system consisting of sliding blocks X and screws Y, such that the distribution plate is located between the retaining plate 2 and the nozzle plate 7.

For cleaning, the molding platens are moved apart and the locking of the cold runner 1 is released, so that after the retaining plate 2 and nozzle plate 7 have been separated, the distribution strips 10-40 hang down freely from the retaining plate 2 and are accessible. For cleaning, the distribution strips 10-40 are displaced relative to one another in the guide rails 50 so that there is sufficient space between the individual distribution strips to allow the distribution channels present in the distribution strips 10-40 to be cleaned. (The strips can also be removed completely.)

The guide grooves 50 are configured such that they are open at the ends, so that the individual distribution strips 10-40 can be removed from the machine if necessary.

LIST OF REFERENCE SIGNS

1 Cold runner block
2 Retaining plate
3 Bolt
4 Free end of the bolt 5 Bolt head
6 Runner
7 Nozzle plate
10 Distribution strip
20 Distribution strip
30 Distribution strip
40 Distribution strip
50 Guide rail
X Sliding block
Y Screw

The invention claimed is:

1. A cold runner block in a vertically operating injection molding machine for processing elastomer materials with an upper fixed molding platen and a molding platen arranged thereunder which is movable relative to the fixed molding platen, between which a molding tool having a plurality of mold cavities is arranged and wherein the cold runner block is arranged between the fixed molding platen and the molding tool, the cold runner block containing a distribution plate having the cold runners and containing a nozzle plate with nozzles each assigned to one of the plurality of mold cavities,
wherein the distribution plate formed from a plurality of distribution strips (10-40) is arranged on a retaining plate (2), which can be fastened to the fixed, feed-side molding platen, in such a way that each distribution strip (10-40) is connected by means of two bolts (3) to the retaining plate (2) wherein the head (5) of each bolt (3) facing away from the distribution strip (10-40) forms a retaining element which is T-shaped in section, the retaining element being displaceably guided in the direction transverse to the distribution strip's longitudinal axis in guide rails (50) which are formed in the retaining plate (2) and are designed in section to complement the bolt head (5).

2. The cold runner block according to claim 1, wherein a central runner (6) is provided which passes through the retaining plate (2) and leads into the distribution plate.

3. The cold runner block according to claim 1, wherein the bolts (3) supporting the distribution strips (10-40) are arranged in the guide grooves (50) with vertical play such that they can be moved up and down.

4. The cold runner block according to claim 2, wherein the bolts (3) supporting the distribution strips (10-40) are arranged in the guide grooves (50) with vertical play such that they can be moved up and down.

\* \* \* \* \*